May 20, 1941.  F. S. FLOETER  2,242,578
BROACHING MACHINE
Filed Oct. 12, 1938
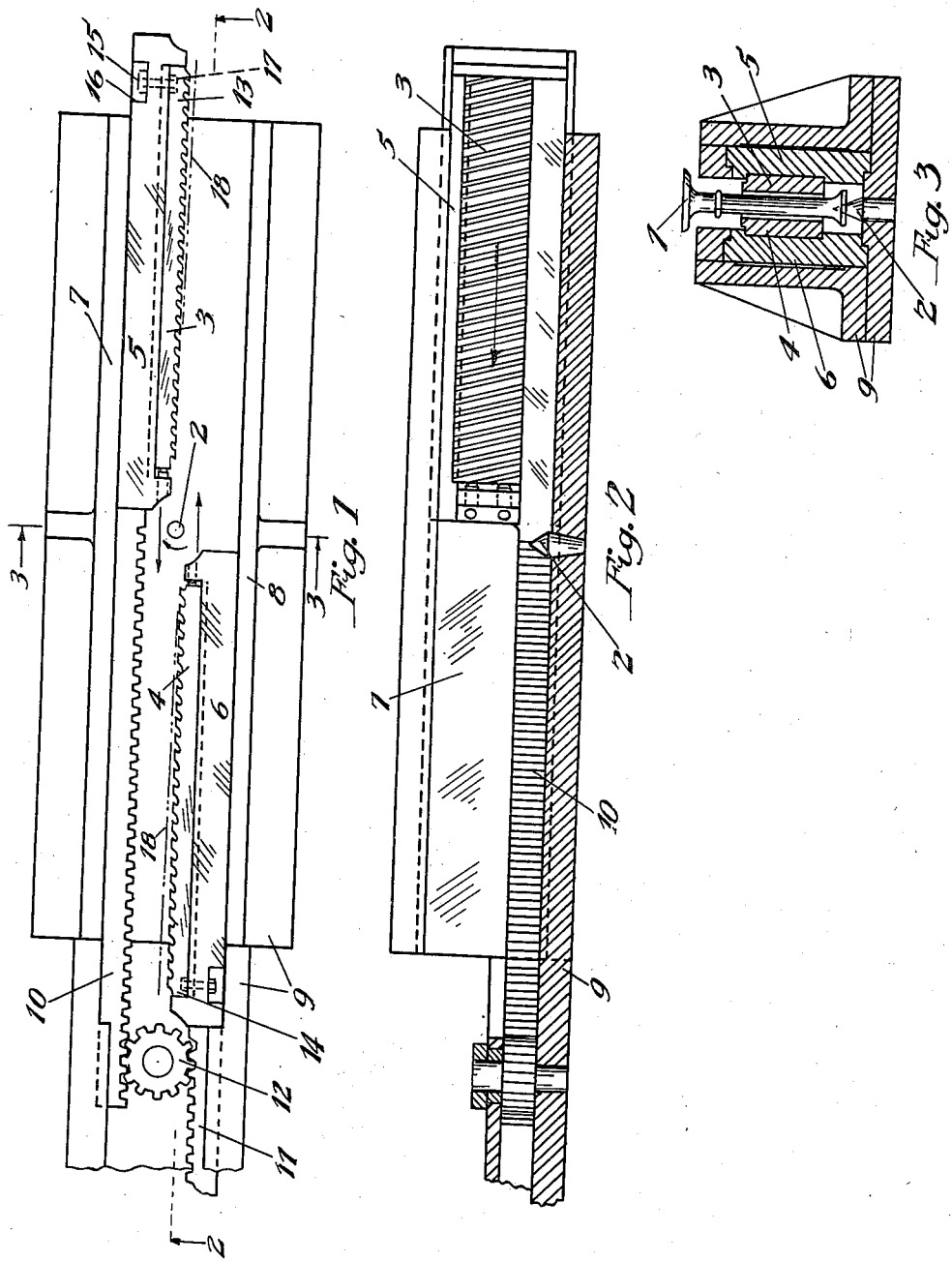
INVENTOR
FREDERICK S. FLOETER
BY
George B. Willcox
ATTORNEY Patented May 20, 1941

2,242,578

UNITED STATES PATENT OFFICE 2,242,578

BROACHING MACHINE

Frederick S. Floeter, Saginaw, Mich., assignor to Wickes Bros., Saginaw, Mich., a corporation of Michigan Application October 12, 1938, Serial No. 234,648

2 Claims. (Cl. 82—1)

This invention is concerned with the problem of turning cylindric work pieces by broaching.

In machines for doing work of this character the work piece rotates about its longitudinal axis, which is a fixed axis. Each tooth of the traveling broach cuts into the work piece in its regular order, removing a chip or shaving of predetermined thickness. The aggregate depth of cut is determined by the number of teeth that engage the work during one working traverse of the broach, usually a sufficient number to bring the work to the desired finished diameter.

In my copending application, Serial No. 116,303, there is described and claimed a machine of the class referred to, wherein a power-actuated platen is mounted for lengthwise reciprocatory movement past the work piece and carries a pair of parallel broaches located on opposite sides of the center line of the work piece. The broaches are adapted for movement relatively to the platen in a lateral direction, that is, transverse to the plane defined by the cutting edges of the teeth. The lateral movement is imparted to them by a second power means that operates coincidentally with the above mentioned lengthwise reciprocatory movement of the platen that carries them.

My present invention is in general like that set forth in the application above referred to, being intended to do the same class of work, but it differs in several respects that involve novelty in mode of operation, in the arrangement of the broaches relatively to each other, and in the means for their individual adjustment toward and away from the work piece for the purpose of establishing the rate of removal of metal from the work and fixing the diameter of the finished piece. The copending application discloses a preferred arrangement of parts wherein two opposed broaches move, during their cutting stroke, past the rotating work piece while traveling in the same direction, both being mounted on the same traveling platen; whereas, in the present improvement the broaches travel past the work simultaneously in opposite directions, and are mounted each on its own carrier.

An object of the present improvement is to provide such a broaching machine characterized by further simplification in that it employs a less number of working parts such as gears and moving joints, is simple in design, durable, relatively inexpensive to construct, and capable of use for a long time without appreciable wear.

Another object is to provide simplified means for adjusting the space between the broaches so as to attain the desired finished diameter of the work without having to move the entire broach in a direction transverse to its direction of travel, as was done in the copending case. Instead, lateral movement of adjustment is given to one end only of the broach, so that its teeth shall encounter the work one after another in regular order and in slightly offset or echelon arrangement.

This arrangement of the broaches, although simplified and of less expensive structure than the machine referred to, will do the same work, accurately turning and finishing round work pieces that are slender and of small diameter, such as valve stems for internal combustion engines. Dual broaches arranged and operating as here shown will load a spindle-like work piece equally on opposite sides and thus prevent axial springing of the work. The opposed broaches cut alike, for the relative speeds of the broach teeth and of the periphery of the rotating work piece are the same on both sides of the work.

In the accompanying drawing—

Fig. 1 is a diagrammatic plan view of the traveling carriers and broaches together with the rotatable pinion and racks by which the broaches are actuated lengthwise;

Fig. 2 is a longitudinal sectional view on line 2—2 of Fig. 1; and

Fig. 3 is a transverse sectional view on line 3—3 of Fig. 1, showing a work piece being turned by both broaches simultaneously.

Numeral 1, Fig. 3, designates the rotatable work piece to be machined by turning. Here it is shown conventionally as a valve stem supported at one end by a lathe center 2 and understood to be rotated around its longitudinal axis by any suitable means as, for example, a centering chuck which may be of the kind illustrated in my copending application. Since chucking and centering devices are not essential elements of the present claimed invention, being known to builders and users of this class of machinery, it is not deemed necessary to illustrate or describe them here in further detail.

Machining is done by a pair of opposed cooperating broaches 3, 4, that have lengthwise reciprocatory movement, as indicated by arrows, Figs. 1 and 2, past the rotating work piece in opposite directions.

Each broach is mounted on a carrier 5, 6 which is mounted for lengthwise reciprocatory movement in ways 7, 8, on the machine bed 9. The respective carriers 5, 6 may be actuated by toothed racks 10, 11 in mesh with a pinion 12 which is understood to be driven by a suitable source of power, not shown.

Rotation of pinion 12 counterclockwise moves the carriages and broaches past each other for the cutting stroke, and clockwise rotation retracts them. A single pass of the two broaches completes the cut, reducing the work to a diameter determined by the distance apart of the planes which are defined by the cutting edges of the teeth, as is shown in Fig. 1. In that view the broach teeth have their cutting edges alined so as to define a plane substantially tangent to the periphery of the work piece and parallel with a median plane which includes the axis of rotation of work piece 1.

If, however, the trailing ends 13, 14 of the broaches have been adjusted in their carriers 5, 6 so as to be closer together than their advancing ends, then the planes defined by the teeth will not be parallel, and the finished diameter of the work at completion of the cutting stroke will be equal to the space between the opposed teeth at the trailing ends 13, 14.

A means for effecting such adjustment for various cutting effects is shown diagrammatically in Fig. 1, where numeral 15 designates a set bolt threaded in carrier 5 near its trailing end, the head of the bolt being received in a recess 16 of the carrier. The end 17 of the bolt shank engages the trailing end of broach 3 so the bolt can move that end laterally, as is indicated in an exaggerated manner by a broken line 18. The planes of the broach teeth will then converge slightly toward the trailing end, and the teeth of both broaches will engage the work equally on its opposite diameters and successive teeth will take off equal amounts of metal simultaneously until the broach carriers have completed their working strokes and have been returned to the position, Fig. 1. The finished piece is then removed from the machine and a new one is inserted.

The ratios of peripheral speed of the work to translational speed of the teeth is the same on both sides of the work and consequently the resultant diametral cutting thrusts are substantially equal and opposite and there is practically no tendency to force the work piece to one side more than the other, giving very accurate results on slender work pieces.

Having thus described my invention, what I claim and desire to secure by Letters Patent is:

1. In a mechanism for turning a cylindric work piece by broaching, said work piece being mounted for rotation in axially fixed position; broaches arranged to cut shavings from the opposite sides of said work piece; carriers for said broaches; reciprocating means adapted to move said carriers and the broaches thereon lengthwise simultaneously and in opposite directions past said work piece while rotating about its fixed axis; and adjusting means operating between said carrier and an end portion of the broach thereon adapted to effect various lateral displacements of such end, to establish the rate of removal of metal from the work and to fix the diameter of the finished piece.

2. In a mechanism for turning a cylindric work piece by broaching, said work piece being mounted in fixed position for rotation about its longitudinal axis; broaches arranged to cut shavings from the opposite sides of said work piece; carriers for said broaches; reciprocating means adapted to move said carriers and the broaches thereon lengthwise simultaneously and in opposite directions past said work piece while rotating about its fixed axis, said means comprising opposed toothed racks spaced apart and secured to the respective broaches and a rotatable pinion between said racks and in mesh therewith; and adjusting means operative between said carrier and an end portion of the broach thereon adapted to effect various lateral displacements of such end, to establish the rate of removal of metal from the work and to fix the diameter of the finished piece.

FREDERICK S. FLOETER.